United States Patent Office 3,814,733
Patented June 4, 1974

3,814,733
ISOMERIZATION OF (+)-TRANS - 2,3-EPOXY-CIS-CARANE TO (+)-CIS-2,8-p-MENTHADIENE-1-OL
James O. Bledsoe, Jr., John M. Derfer, and Walter E. Johnson, Jr., Jacksonville, Fla., assignors to SMC Corporation, Cleveland, Ohio
No Drawing. Filed July 27, 1970, Ser. No. 58,716
Int. Cl. C07c 35/08
U.S. Cl. 260—631.5
5 Claims

ABSTRACT OF THE DISCLOSURE

Isomerization of (+)-trans-2,3-epoxy-cis-carane to (+)-cis-2,8-p-menthadiene-1-ol is effected by contacting the epoxy carane with metatitanic acid at a temperature of from 25–200° C., the catalyst concentration being broadly inverse to temperature and restricted for avoidance of dehydration of the menthadiene-1-ol product.

---

Terpene epoxides often have heretofore been converted to alcohols by contacting with mild to strong acids such as acetic or sulfuric acid. For example, Ohloff and Giersch in vol. 51 of Helvetica Chimica Acta, Fasciculus 6 (1968), pp. 1328–1342, show converting trans-4,5-epoxy-cis-carane, an isomer of (+)-trans-2,3-epoxy-cis-carane, to 5,8-meta-menthadiene-4-ol. However, when such epoxy caranes are treated with such acids, a product containing a substantial proportion of byproducts which are difficult to separate from any one desired product formed is obtained. This is the case where (+)-trans-2,3-epoxy-cis-carane (hereinafter sometimes referred to as 2-carene oxide) is treated.

It has been found that (+)-trans-2,3-epoxy-cis-carane can be converted to a product mixture containing a substantial proportion of (+)-cis-2,8-p-menthadiene-1-ol (hereinafter sometimes referred to as cis-isolimonenol) with an almost insignificant byproduct formation (usually not more than 25% by weight of the reaction products formed). Moreover, the byproducts formed can be easily separated from the cis-isolimonenol product. This process then is particularly advantageous since the crude cis-isolimonenol formed can be converted to levo-menthol by techniques such as those described in U.S. Pats. 2,894,040 and 2,972,632, levo-menthol being an active perfumery and flavoring component.

Broadly this invention is an improvement in a process for converting 2-carene oxide into cis-isolimonenol which comprises: contacting 2-carene oxide with a small but catalytically effective proportion of metatitanic acid, the proportion of metatitanic acid being between about 0.2–10% by weight basis weight of the 2-carene oxide at a temperature between about 25–200° C. for a time sufficient for forming cis-isolimonenol but for a time insufficient for effective substantial dehydration of the cis-isolimonenol formed.

Advantages of the process include: excellent conversion of 2-carene oxide to cis-isolimonenol; excellent yields based on the original 2-carene oxide reacted; less byproduct components, thus eliminating difficult separation techniques for recovery of concentrated cis-isolimonenol; and an economical route for making cis-isolimonenol and levo-menthol.

2-carene oxide ordinarily has been represented by Formula I below, although some writers use the numbering system of Formula II, below, for the same compound and call it "4-carene oxide." Additionally, in the past, these numbers "2" and "4" sometimes have been preceded by the word "delta." Formula III, below, is a structural formula for the product (+)-cis-2,8-p-menthadiene-1-ol prepared by contacting 2-carene oxide with metatitanic acid. Formula IV, below, is representative of (+)-trans-4,5-epoxy-cis-carane.

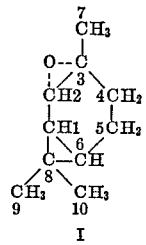

I
(+)-trans-2,3-epoxy-cis-carane (2-carene oxide)

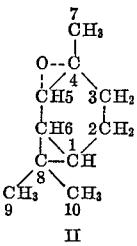

II
(+)-trans-4,5-epoxy-cis-carane (4-carene oxide)

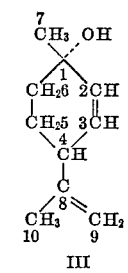

III
(+)-cis-2,8-p-menthadiene-1-ol (cis-isolimonenol)

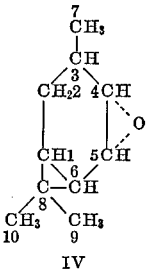

IV
(+)-trans-4,5-epoxy-cis-carane

It is surprising that related terpene oxides, e.g., α-pinene and β-pinene oxide, when treated similarly to 2-carene oxide with metatitanic acid do not convert anywhere nearly as efficiently as 2-carene oxide for forming the corresponding alcohols, i.e., without forming an insignificant proportion of byproducts, nor does (+)-trans-4,5-epoxy-cis-carane convert to the alcohol in such proportion as 2-carene oxide with insignificant byproduct formation.

The catalyst used for converting the 2-carene oxide to cis-isolimonenol is solid phase particulate metatitanic acid. Metatitanic acid is a mild acid catalyst and performs with the appropriate catalytic properties for causing concomitant cleavage of the cyclopropane and oxide rings without causing rapid or extreme dehydration of the tertiary allylic alcohol group. Although other solid phase particulate catalysts having acidic properties, such as acid washed alumina, clays, or acids such as acetic or sulfuric, induce isomerization, they generally effect dehydration of a portion of the cis-isolimonenol formed resulting in a product containing a significant amount of by-products. Even silicic and boric acid catalysts, which are very mild acid catalysts, do not effect conversion of 2-carene oxide to cis-isolimonenol with the efficiency and effectiveness of metatitanic acid.

Metatitanic can be thought of as a hydrous titanium oxide. Metatitanic acid has been represented as $TiO_2 \cdot xH_2O$, where $x$ represents the number of molecules of bound water. This value varies over wide limits depending on the method of preparation. The acid is conventionally formed by adding alkali metal hydroxide to an aqueous solution of titanium IV salt or by adding hydrochloric acid to an alkyl titanate, forming a precipitate. On boiling, the precipitate becomes granular and is solid phase. The precipitate then is rinsed with water and dried for use in the instant process. Other processes are known. Although no solvent vehicle is necessary for the reaction, where carene oxide is contacted with metatitanic acid inert organic solvents are used advantageously for providing a medium for carrying out the reaction. A low-boiling inert organic solvent often reduces cis-isolimonenol dehydration occasioned by localized "hot spots" in the reaction medium where no solvent exists. Inert organic solvents particularly adapted for practicing this invention are those which do not react with 2-carene oxide or cis-isolimonenol at the reaction temperature (between about 25°–200° C.) or azeotrope therewith. Preferably the solvents have atmospheric boiling points lower than 2-carene oxide or cis-isolimonenol and boil at the specific temperature and pressure desired for the reaction. Examples of useful solvents include the members of the paraffin series having 5–12 carbon atoms, for example, pentane, n-hexane, kerosene, octane, aromatic hydrocarbons, i.e., benzene, toluene, xylene, etc., low-boiling naphthas (less than 240° C. at atmospheric pressure), halogenated hydrocarbons, etc., ketones, e.g., acetone, methyl ethyl ketone, methyl isoamyl ketone, etc., ethers, e.g., ethyl ether, dioxane, tetrahydrofuran, alkyl esters, e.g., ethyl acetate and methyl acetate.

Broadly isomerization and conversion of 2-carene oxide to cis-isolimonenol is accomplished at a temperature between about 25°–200° C. in the presence of about 0.1–10% metatitanic acid by weight of the 2-carene oxide reactant at a pressure from subatmospheric to 5,000 p.s.i.g. When lower temperatures are employed, the reaction rate drops off substantially even when the catalyst level is increased to higher proportions and reaction times of 24–36 hours are not uncommon. As might be expected, the reaction rate increases with an increase in temperature. The catalyst concentration is broadly inverse to temperature and thus generally is reduced as the temperature is increased from 25° C. for minimizing cis-isolimonenol dehydration. Where temperatures, for example, are between 150°–200° C., as little as 0.1–0.5% metatitanic acid by weight of 2-carene oxide is needed to catalyze the reaction and reaction times of from a few seconds to a few minutes, e.g., 5 minutes. Broadly, the reaction is allowed to proceed for a time sufficient for forming cis-isolimonenol but insufficient for effecting dehydration of the cis-isolimonenol. In most situations, the reaction is allowed to proceed until the cis-isolimonenol concentration reaches at least 75%, and preferably 85%, by weight of the reaction product. This takes about 1–3 hours when 2-carene oxide is contacted with 1½% to 3½% metatitanic acid catalyst at 50°–100° C.

Under preferred conditions, 2-carene oxide is converted to cis-isolimonenol in liquid phase. However, vapor phase contact of the reactant with catalyst can also be conducted. Other components can be present in the reaction mixture provided that they do not azeotrope or interfere with the reaction. For example, mixtures of 2-carene oxide, having 3-carene oxide, 2-carene and 3-carene, can be employed without harmful effects. These components, as is shown in Example 3, can be easily separated from the product cis-isolimonenol by fractional distillation. Batch operation is preferred for reasons of efficiency and economy, but facilities operating continuously can also be employed for the conversion.

The materials of construction for the reactor and reflux condenser can be virtually any material having sufficient structural strength, corrosion resistance and temperature resistance to withstand the operation. Vessels having glass, porcelain enamel or polytetrafluoroethylene lining can be used. Also, vessels of stainless steel can be used.

The following examples are provided to illustrate preferred embodiments of this invention but are not intended to limit the scope thereof. All parts are parts by weight, all percentages are weight percentages, and all degrees are degrees centigrade unless otherwise specified.

EXAMPLE 1

Five hundred parts hexane are charged to a vessel operated at atmospheric pressure and equipped with an agitator and reflux condenser. Continuous agitation is maintained while 2.6 parts dry, solid phase metatitanic acid are added to the vessel. Heat is applied to the vessel to achieve a reflux temperature of about 70° C. The hexane condensate is allowed to return to the vessel. At the reflux temperature, 130 parts of 2-carene oxide are added to the vessel at a rate of 2 parts per minute. After all of the 2-carene oxide is added, the contacting period is allowed to proceed for one hour. At the end of the hour, the agitation is stopped and the vessel contents cooled to 25° C. The contents are removed and filtered, the filtrate containing solvent and cis-isolimonenol, the cake consisting essentially of solid phase metatitanic acid. The filtrate then is washed with 300 parts of a 5% sodium hydroxide solution for removing any traces of acid, then followed by a water wash for removing any water soluble salts formed by the addition of sodium hydroxide. Then aqueous layers formed by such additions are separated from the product oil layers by decantation. The oil layer obtained on decantation is dried by adding anhydrous magnesium sulfate thereto and filtering the magnesium sulfate from the oil layer. This filtrate is distilled at atmospheric pressure to strip off the hexane, leaving a residue containing cis-isolimonenol. Analysis of this residue by gas-liquid chromatography shows 85% cis-isolimonenol, 5% p-cymene-8-ol, 5% hydrocarbon and 5% unreacted 2-carene oxide. The product (110 parts) is colorless after being distilled and has a boiling point of 60° C. at 0.4 mm. Hg, a specific gravity $n_D^{25}$—1.4878 and optical rotation $[\alpha]_D^{25}$ 186.7°. An 85% yield based on the original 2-carene oxide charged is obtained. The product is suitable for synthesis of levomenthol by the process set forth in U.S. Pats. 2,894,040 and 2,972,632.

When a similar operation is done using 10 parts of 2% sulfuric acid solution in water per part of 2-carene oxide in place of the metatitanic acid catalyst, analysis of the reaction product shows 20% cis-isolimonenol product, 20% isopiperitenol, 10% hydrocarbon mixture, and 50% 2-p-menthene-1,8-glycol bypdoduct. The byproducts are difficult to separate from the cis-isolimonenol product.

EXAMPLE 2

Five hundred parts n-heptane are charged to a glass-lined vessel equipped with an agitator and reflux condenser. One hundred thirty-six parts of 2-carene oxide are charged to the vessel. Continuous agitation is maintained throughout the reaction. Three parts solid phase metatitanic acid are added to the vessel and suspended therein by such agitation. The temperature of the contents is increased from 25° C. at a rate of about 10° C. per minute unitl a reflux temperature of 80° C. is obtained. This temperature is maintained during the reaction. Samples of the reaction product are taken at periodic intervals and analyzed by gas chromatography for cis-isolimonenol content. After about 1½ hours reaction, the analysis of the reaction mixture shows 90% cis-isolimonenol, 5% p-cymene-8-ol and 5% unreacted 2-carene oxide. At this point, the agitation is stopped and the vessel contents cooled to 25° C. Recovery of the cis-isolimonenol is accomplished in the same manner as in Example 1.

EXAMPLE 3

One hundred thiry-six parts of a mixture having 5% 2-carene, 33% 3-carene, 35% 2-carene oxide and 27% 3-carene oxide with about 0.2–10% by weight metatitanic with an agitator and reflux condenser containing 350 parts methylene chloride. Six and 6/10 parts of solid phase metatitanic acid are charged to the vessel. Agitation is maintained while the vessel contents are heated gradually to the reflux temperature of methylene chloride at atmospheric pressures. The reaction is allowed to proceed at the reflux temperature (40° C.). Samples of the reaction product are taken at periodic intervals until analysis by gas chromatography shows 30% cis-isolimonenol product, 3% 2-carene, 32% 3-carene, 3% 2-carene oxide, 26% 3-carene oxide, 3% p-cymene-8-ol and 3% 2-p-menthene-1,8-glycol byproduct. The reaction time is about 1½ hours. Cis-isolimonenol is recovered from the mixture in the manner set forth in Example 1. The by-products present in this mixture are easily separated from the product cis-isolimonenol.

What is claimed is:

1. A process for converting 2-carene oxide into product containing at least about 75% by weight of (+)-cis-2,8-p-menthadiene-1-ol, the process comprising: containing 2-carene oxide with about 0.2–10% by weight metatitanic acid based on the 2-carene oxide, said contacting being at temperatures of between about 25–200° C. to convert said 2-carene oxide to product containing by weight at least about 75% (+)-cis-2,8-p-menthadiene-1-ol.

2. The process in claim 1 wherein said contacting takes place within an inert organic solvent which is inert to 2-carene oxide and to said (+)-cis-2,8-p-menthadiene-1-ol.

3. The process in claim 1 wherein said (+)-cis-2,8-p-menthadiene comprises at least about 85% by weight of said product.

4. The process of claim 1 wherein said metatitanic acid is present in a proportion of between about 1½% to 3½% by weight of the 2-carene oxide.

5. The process of claim 4 wherein said contacting temperature is between about 50–100° C., the contacting time is between about 1–3 hours and the contacting pressure is atmospheric.

References Cited

UNITED STATES PATENTS

| | | | |
|---|---|---|---|
| 2,863,882 | 12/1958 | Bain et al. | 260—631.5 |
| 3,014,047 | 12/1961 | Bain et al. | 260—631.5 |
| 2,935,526 | 5/1960 | Bain | 260—631.5 |
| 3,407,242 | 10/1968 | Booth | 260—631.5 |
| 1,917,179 | 7/1933 | Young et al. | 260—632 B |

FOREIGN PATENTS

| | | | |
|---|---|---|---|
| 877,138 | 9/1961 | Great Britain | 260—632 B |

OTHER REFERENCES

Gollnick et al.: "Tetrahedron Letters," No. 21 (1966), pp. 2335–2341.

Olloff et al.: "Helv. Chim. Act.," vol. 51 (1968), pp. 1328–42.

Merck Index, 6th ed. (1952), p. 960.

HOWARD T. MARS, Primary Examiner

J. E. EVANS, Assistant Examiner

U.S. Cl. X.R.

260—618 R